United States Patent [19]

Dromsky

[11] 3,943,011
[45] Mar. 9, 1976

[54] DEFORMABLE COMPOSITE MATERIAL

[75] Inventor: John A. Dromsky, North Attleboro, Mass.

[73] Assignee: Texas Instruments Incorporated, Dallas, Tex.

[22] Filed: Aug. 31, 1973

[21] Appl. No.: 393,538

Related U.S. Application Data

[62] Division of Ser. No. 235,297, March 16, 1972, Pat. No. 3,795,297.

[52] U.S. Cl. .............................. 148/34; 29/196.1
[51] Int. Cl.² ........................................ B32B 15/00
[58] Field of Search ...................... 29/196.1; 148/34

[56] References Cited
UNITED STATES PATENTS

| | | | |
|---|---|---|---|
| 2,034,278 | 3/1936 | Becket | 29/196.1 |
| 2,653,117 | 9/1953 | Keene | 29/196.1 |
| 2,753,623 | 7/1956 | Boessenkool | 29/196.1 |
| 3,240,572 | 3/1966 | Faber | 29/196.1 |
| 3,393,445 | 3/1968 | Ulam | 29/196.1 |
| 3,537,828 | 11/1970 | Henrickson | 29/196.1 |

*Primary Examiner*—L. Dewayne Rutledge
*Assistant Examiner*—Arthur J. Steiner
*Attorney, Agent, or Firm*—James P. McAndrews; John A. Haug; Russell E. Baumann

[57] ABSTRACT

A strip of composite metal laminate material embodying a thin inner layer of stainless steel sandwiched between and metallurgically bonded to two relatively thicker outer layers of low carbon steel is subjected to a brief, high temperature heat treatment followed by a relatively much longer heat treatment at much lower temperature for substantially eliminating the yield point in the laminate and for maximizing formability of the laminate while permitting some reduction in the corrosion resistance properties of the stainless steel layer of the laminate. The composite strip material is then readily formed into two, concentrically disposed convolutions of the strip material while the laminate material is in this highly formable condition. The convolutions of the strip material are then brazed together to provide a double-walled tubing, the brazing procedure being regulated to effect selected heat treatment of the formed composite material for substantially restoring the corrosion resistance properties of the stainless steel layer of the laminate within the finished tubing.

4 Claims, 5 Drawing Figures

3,943,011

DEFORMABLE COMPOSITE MATERIAL

This is a division, of application Ser. No. 235,297, filed Mar. 16, 1972, now U.S. Pat. No. 3,775,194.

Conventional automotive brake tubing and the like is manufactured by forming low carbon steel strip material into concentrically disposed convolutions of the material and by brazing the convolutions together to form a double-walled tubing construction. This conventional tubing is manufactured at relatively low cost because the industry has developed a well standardized process and equipment for manufacturing tubing of this construction in very large quantities. More recently, it has been proposed that such tubing be formed from a strip of composite metal laminate material embodying a thin inner layer of stainless steel sandwiched between and metallurgically bonded to two relatively thicker outer layers of low carbon steel. It is found that this composite material is readily formed in the manner of low carbon steel to provide the desired double-walled tubing configuration, is readily brazed in the manner of the low carbon steel material previously used in such tubing, and provides the resultant tubing with significantly increased resistance to corrosion, particularly including pitting types of corrosion. However, it is desirable to provide such composite laminate material in an economical way to permit even greater ease in forming material into the desired tubing configuration.

It is an object of this invention to provide a novel and improved composite metal laminate material for use in making brazed, double-walled tubing; to provide such a material which is readily formed into the desired double-walled tubing configuration; to provide such a tubing material which is readily brazed using conventional brazing equipment to form the desired double-walled tubing; to provide double-walled tubing made from such composite material; to provide such tubing which displays excellent resistance to corrosion particularly including pitting types of corrosion; to provide such tubing which is of economical construction, and to provide novel and improved methods for making said composite metal laminate material and for making said double-walled tubing.

Briefly described, the composite metal laminate material of this invention comprises at least one, thin inner layer of stainless steel which is sandwiched between and metallurgically bonded to two relatively thicker outer layers of low carbon steel. This composite material is initially formed in any conventional manner by roll-squeezing the metal layers of the laminate together, preferably at room temperature, with substantial reduction in the thickness of the metal layers to form the desired metallurgical bonds between the metal layers. In accordance with this invention, the composite metal material is then heated to a relatively high temperature on the order of 1850° F. or more for a brief period of time for substantially annealing the stainless steel layer of the laminate material. The composite material is then heated to a relatively lower temperature on the order of 1100° F. or less for a substantially longer period of time. It is found that this latter heat treatment step substantially softens the low carbon steel layers of the laminate and modifies the properties of the laminate so that the laminate is highly formable and displays substantially no yield point during subsequent deformation of the laminate. It is also found that this latter heat treatment tends to cause some undesirable reduction in the corrosion resistance properties of the stainless steel layer of the laminate.

The resulting composite material is then formed into two concentrically disposed convolutions of the strip material to form a tubing configuration in a conventional manner, these convolutions of the strip material then being heated and brazed together for securing the convolutions together to form the desired double-walled tubing. The heating of the composite material which is performed for accomplishing brazing of the tubing material is regulated for substantially restoring the corrosion resistance properties of the stainless steel layer of the laminate material.

In this way, it is found that the desired layers of metal are metallurgically bonded together in a laminate material in a secure and economical way. The described heat treatment of the composite material permits the composite material to be very easily formed into the desired tubing configuration and modifies the properties of the materials embodied in the composite so that the composite material displays substantially no yield point during deformation of the material into the desired tubing configuration. Further, the deformed laminate material is readily brazed in a conventional manner for securing convolutions in the laminate material together to form the desired double-walled tubing construction, the heat treatment which is employed in brazing also serving to modify the properties of the laminate material for substantially restoring the initial high resistance to corrosion of the stainless steel layer of the laminate.

Other objects, advantages and details of the composite material, tubing and methods of this invention appear in the following more detailed description of preferred embodiments of the invention, the detailed description referring to the drawings in which.

Figure 1:
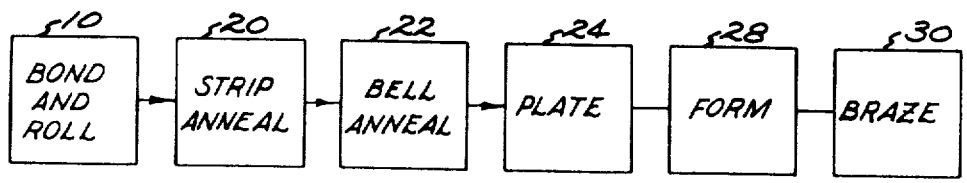
FIG. 1 is a block diagram illustrating process steps in the manufacture of composite laminate materials and tubings in accordance with this invention.
Figure 2:
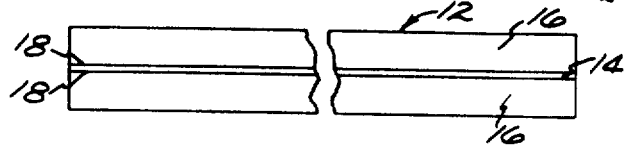
FIG. 2 is a section view to enlarged scale along the transverse axis of a strip of composite material provided by this invention.

Referring to the drawings, the block diagram of FIG. 1 illustrates the general steps contemplated for making a double-walled tubing in accordance with this invention. That is, as is indicated at 10 in FIG. 1, the first step in forming the desired tubing construction calls for roll-bonding of a plurality of metal layers to form a composite metal laminate 12 as shown in FIG. 2, the metal laminate embodying a thin inner layer 14 of stainless steel which is sandwiched between two relatively thicker outer layers 16 of low carbon steel and which is metallurgically bonded to the low carbon steel layers substantially throughout the interfaces 18 between the metal layers. Roll-bonding processes for making such composite metal laminate materials are well known and will be understood that, in such roll-bonding processes, strips of annealed steel materials or the like having surfaces which have been cleaned for removing bond-deterrent substances therefrom are initially brought into interfacial contact with each other. The contacting metal strips are then squeezed together between a pair of pressure rolls with substantial reduction in the thicknesses of the strip materials, thereby to metallurgically bond the strips to each other to form a composite metal laminate in which the strip materials form respective layers of the laminate. Usually the resulting bonded composite material is heated for sintering and strengthening the bonds between the metal layers of the composite and for intermediately annealing or stress relieving the materials of the composite and the composite is then rolled again for further reducing the composite material to a desired final gauge or thickness. Such roll-bonding processes are illustrated, for example, in U.S. Pat. Nos. 2,691,815 and 2,753,623. As such roll-bonding processes are well known and as various conventional roll-bonding processes can be employed in making the laminate material 12 within the scope of this invention, formation of the laminate 12 by roll-bonding is not further described herein and it will be understood that the laminate 12 embodies layer materials as above described, that the layers of the laminate material are metallurgically bonded together substantially throughout their interfacially contacting surfaces, and that materials of the composite laminate have been work-hardened to at least some extent by the reduction in thickness of the laminate layer materials which has occurred during roll-bonding of the laminate or during subsequent rolling of the laminate to a desired final gauge or thickness.

In accordance with this invention, the composite metal laminate 12 embodies various conventional steel materials. For example, the thin inner layer 14 of stainless steel material in the laminate preferably comprises an austenitic stainless steel such as Type 304 Stainless Steel having the composition, by weight, as set forth in Table I but is also formed of various other conventional stainless steel materials such as the additional materials set forth in Table I within the scope of this invention. Similarly, the layers 16 of the laminate 12 are preferably formed of low carbon steels such as Type 1008, Low Carbon Steel having the composition, by weight, as set forth in Table II but is also formed of various steel materials such as the additional materials set forth in Table II within the scope of this invention. Various types of low carbon steels including rimmed, capped and aluminum killed low carbon steels are suited for such use. The stainless steel layer 14 of the laminate material 12 desirably comprises from 2 to 25 percent, and preferably about 10 percent, of the total thickness of the composite metal laminate material.

In accordance with this invention, the composite metal laminate material 12 as initially formed by roll-bonding, or as additionally rolled to final gauge or thickness after bonding, is heated to a relatively high temperature for a relatively brief period of time for substantially annealing the thin inner layer 14 of stainless steel material in the laminate as is diagrammatically illustrated at 20 in FIG. 1. In this regard, it is noted that the laminate material as bonded and rolled has usually under gone about 40 to 70 percent reduction in thickness since the previous intermediate annealing or heat treatment of the material of the composite. The laminate material is therefore subjected to this first heat treatment step for annealing the stainless steel material to remove the work-hardening of the stainless steel which had occurred during roll-bonding of the laminate or during rolling reduction of the bonded laminate to a desired final gauge. Preferably, the laminate material is heated in a reducing atmosphere at a temperature in the range from about 1850° F. to about 2050° F. for a period from about one-half to two minutes for accomplishing strip annealing of the stainless steel layer of the laminate, the strip of laminate material being fed through any conventional strip annealing furnace or the like for accomplishing this annealing step. For example, in preferred embodiments of this invention, the laminate material 12 is advanced through a reducing atmosphere in a conventional strip annealing furnace at a temperature in the range from 1850° F. to 2000°F., and preferably at a temperature of 1950° F., the strip having a residence time of about one minute in the furnace. The heated laminate material is then preferably cooled to about 150° F. within about one minute by passing the material through a cooling reducing atmosphere, the material then being coiled and permitted to cool to room temperature. In this regard, the strip of laminate material sent through the strip annealing furnace is provided with very clean, dry and reduced surfaces which would tend to stick together quite easily. Accordingly, coiling of the strip of laminate material 12 after said strip annealing is preferably regulated in any conventional manner to minimize tension in the coil of the laminate material to avoid sticking together of the outer surfaces of the laminate during subsequent batch heat treatment of the coil of laminate material.

In accordance with this invention, as is indicated at 22 in FIG. 1, the composite metal laminate material 12 is then subjected to additional heat treatment at a rela-

TABLE I

| Type | Carbon (Max.) | Manganese | Silicon (Max.) | Chromium | Nickel | Phosphorous (Max.) | Sulfur (Max.) | Iron |
|------|---------------|-----------|----------------|----------|--------|--------------------|---------------|------|
| 201  | 0.15 | 5.50–7.50   | 1.00 | 16.00–18.00 | 3.50–5.50  | 0.06  | 0.030 | Bal* |
| 202  | 0.15 | 7.50–10.00  | 1.00 | 17.00–19.00 | 4.00–6.00  | 0.06  | 0.030 | Bal* |
| 301  | 0.15 | 2.00 (Max.) | 1.00 | 16.00–18.00 | 6.00–8.00  | 0.045 | 0.030 | Bal  |
| 302  | 0.15 | 2.00 (Max.) | 1.00 | 17.00–19.00 | 8.00–10.00 | 0.045 | 0.030 | Bal  |
| 304  | 0.08 | 2.00 (Max.) | 1.00 | 18.00–20.00 | 8.00–12.00 | 0.045 | 0.030 | Bal  |
| 321  | 0.08 | 2.00 (Max.) | 1.00 | 17.00–19.00 | 9.00–12.00 | 0.045 | 0.030 | Bal* |

*Type 201 and 202 Stainless Steels incorporate 0.25 percent, by weight, (max.) of nitrogen and Type 321 Stainless Steel additionally incorporates approximately 0.40 percent, by weight, of titanium.

TABLE II

| Type | Carbon | Manganese | Phosphorous (Max.) | Sulfur (Max.) | Iron |
|------|--------|-----------|--------------------|---------------|------|
| 1006 | 0.08 (Max.) | 0.25–0.40 | 0.040 | 0.050 | Bal |
| 1008 | 0.10 (Max.) | 0.25–0.50 | 0.040 | 0.050 | Bal |
| 1010 | 0.08–0.13   | 0.30–0.60 | 0.040 | 0.050 | Bal | tively much lower temperature for a relatively much longer period of time. For example, the metal laminate 12 after having been subjected to a strip annealing type of heat treatment in the manner above described is preferably heated to a temperature in the range from about 1050° F. to about 1100° F. in a slightly reducing atmosphere, preferably comprising a mixture of cracked city gas and nitrogen or the like, for a period from about three to about six hours. The material is then permitted to cool to room temperature within a period of about twelve to twenty-four hours. The second heat treatment step 22 leaves the low carbon steel layers of the laminate material in an annealed, highly formable condition. As will be understood, this latter heat treatment to the laminate materials is preferably performed in any conventional manner in a bell or batch annealing furnace or the like.

Figure 3:
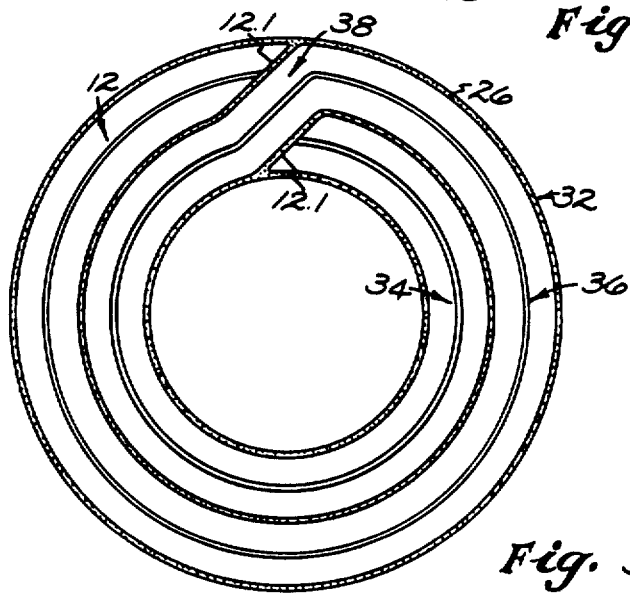
FIG. 3 is a section view to enlarged scale along the transverse axis of the tubing provided by this invention.
Figure 4:
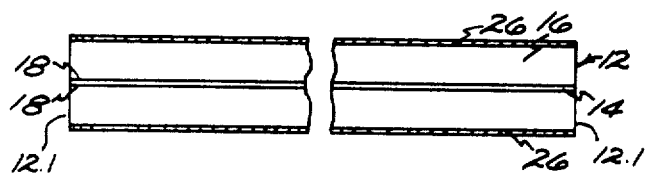
FIG. 4 is a section view similar to FIG. 2 illustrating a step in the process of forming the tubing of FIG. 3 from the composite material of FIG. 2.

In forming tubing from the laminate 12 which has been prepared in the manner described above, the heat-treated composite metal laminate is preferably provided with relatively thin outer surface layers of copper or other brazing material as is diagrammatically indicated at 24 in FIG 1 and as it is illustrated at 26 in FIG. 4. Preferably, for example, the heat-treated laminate 12 is passed through a conventional electrolytic copper plating step for depositing thin copper layers 26 having a thickness on the order of 0.00015 inches on the outer surfaces of the laminate, the lateral edges of the strip of laminate material then being trimmed in any conventional manner for providing unplanted edges 12.1 on the laminate strip as illustrated in FIG. 4. The plated strip of laminate material is then formed into a double-walled tubing configuration as is diagrammatically indicated at 28 in FIG. 1 and is brazed as is diagrammatically indicated at 30 in FIG. 1, thereby to form the tubing 32 as illustrated in FIG. 3. That is, the plated laminate strip material 12 is deformed around the longitudinal axis of the strip 12 to form an inner convolution 34 of the strip material which is connected to an outer convolution 36 of the strip material by an integral, crossover portion 38 of the strip material so that the inner and outer convolutions of the strip material are concentrically disposed with respect to each other. The formed and plated strip material 12 is then heated to a temperature in the range from about 1980° F. to about 2070° F. for a period of time from about one-half to two minutes for melting the layers 26 of copper brazing material to braze the inner and outer convolutions 34 and 36 of the strip material together and to braze the lateral edges 12.1 of the strip material to respective opposite sides of the crossover portion 38 of the strip material, thereby to form tubing 32 as shown in FIG. 3. As will be understood, this copper brazing material is indicated at 26 in FIG. 3 where it is shown that the layers of copper brazing material on the laminate have flowed together in the tubing 32. It should be noted that the plating, forming and brazing of the strip material 12 to form that tubing 32 as above described comprises substantially the same process steps as are conventionally employed in forming double-walled automotive brake tubing and the like from monolithic, low carbon steel strip material. Accordingly the laminate is readily formed and brazed to provide the tubing 32 using the manufacturing equipment conventionally employed in forming brazed, double-walled automotive brake tubing and the like. As these processes are well known, the plating, forming and brazing techniques as described above need not be fully described herein and it will be understood that these process steps serve to form the plated laminate material into the tubing configuration as shown in FIG. 3 and serve to braze portions of the strip material to each other to form the tubing 32, the laminate material 12 being subjected to the noted temperatures for the above noted periods of time during such brazing.

When the composite metal laminate material 12 is formed and processed in the manner above-described to provide the double-walled tubing 32, a number of process and product advantages are obtained. First, each of the material processing steps employed generally corresponds to a process step conventionally used in treating steel materials so that each of the process steps is adapted to be performed on conventional processing equipment. The processing required in accordance with this invention is therefore economical to perform. Further, the laminate material provided by the noted combination of proocess steps displays an excellent degree of formability and is readily formed into the desired tubing using conventional tube-forming equipment. The laminate material also displays substantially no yield point during the deformation required for forming the tubing so that the tube-forming deformation of the laminate occurs uniformly and is easily controlled and so that the deformed tubing material is free of the surface appearance defects usually associated with deforming material such as annealed low carbon steels which customarily display very pronounced yield points. Further, the tubing provided by this invention displays excellent resistance to corrosion, particularly including pitting types of corrosion.

In this regard, the noted advantages of this invention are believed to result from the interaction of several factors. For example, it has been noted above that, after forming of the laminate 12 by roll-bonding and after rolling reduction of the laminate to a desired final thickness, the stainless steel and low carbon steel materials of the laminate have been substantially work-hardened so that the formability of the laminate is relatively low. If the laminate material is to be utilized economically in producing brazed, double-wall tubing as described above, the formability of the laminate must be increased to make the material more compatible with the equipment conventionally used for making such double-walled tubing. In the first, strip annealing type of heat treatment in the process of this invention as indicated at 20 in FIG. 1, the stainless steel layer 14 of the laminate 12 is substantially fully annealed for enhancing the formability of the stainless steel layer of the laminate. Then, during the second, longer and lower temperature heat treatment of the laminate indicated at 22 in FIG. 1, interstitial elements such as carbon and nitrogen in the low carbon steel layers 16 of the laminate are removed from solid solution and are precipitated in the low carbon steel, thereby substantially softening and enhancing the formability of the low carbon steel layers of the laminate. In this regard, while it is understood that the long, slow heat treatment of the laminate tends to compromise and reduce the corrosion resistance properties of the stainless steel layer of the laminate by permitting occurrence of some intergranular carbide precipitation in the stainless steel, this reduction in the corrosion resistance of the stainless steel is tolerated in the laminate in the interest of optimizing the formability of the low carbon steel layers of the laminate. The long slow heat treatment of the laminate is preferably performed at a temperature above 1050° F. to achieve the desired increase in formability of the low carbon steel materials while minimizing intergranular carbide precipitation in the stainless steel layer of the laminate. In this way, the laminate material is adapted to be readily formed into the desired double-walled tubing configuration illustrated in FIG. 3 using conventional tube-forming equipment. Then, subsequently, during brazing of the deformed laminate material to form the tubing 32, the laminate material in the tubing is subjected to brazing temperatures in the range from 1980° F. to about 2070° F. for a period of from about one-half to two minutes, this final heat treatment of the laminate resulting in resolution of the precipitated carbides in the stainless steel layer of the laminate for substantially restoring the original corrosion-resistance properties of the stainless steel layer of the laminate.

With regard to the fact that the heat-treated laminate material 12 of this invention displays substantially no yield point during deformation of the laminate to form the tubing 32, it is noted that the presence of interstitial carbon contributes significantly to the occurrence of the yield point phenomenon in low carbon steel materials. The heat-treatment steps of the process of this invention, in precipitating such interstitial carbon from the low carbon steel materials in the laminate 12, thus significantly affects the yield point characteristics of the laminate. Further, during the long, low temperature heat treatment of the laminate 12 noted above, significant diffusion of carbon from the low carbon steel materials of the laminate into the stainless steel material of the laminate is believed to occur, this diffusion of carbon out of the low carbon steel further affecting the yield point characteristics of the laminate. Finally, it is noted that the stainless steel material of the laminate 12 does not ordinarily display a yield point so that the presence of the stainless steel layer 14 in the laminate is believed to dampen any tendency of the low carbon steel materials of the laminate to display the yield point phenomenon. These three factors are thus believed to cooperate so that the heat-treated laminate material 12 does not display a yield point during formation of the laminate into the tubing 32.

Figure 5:
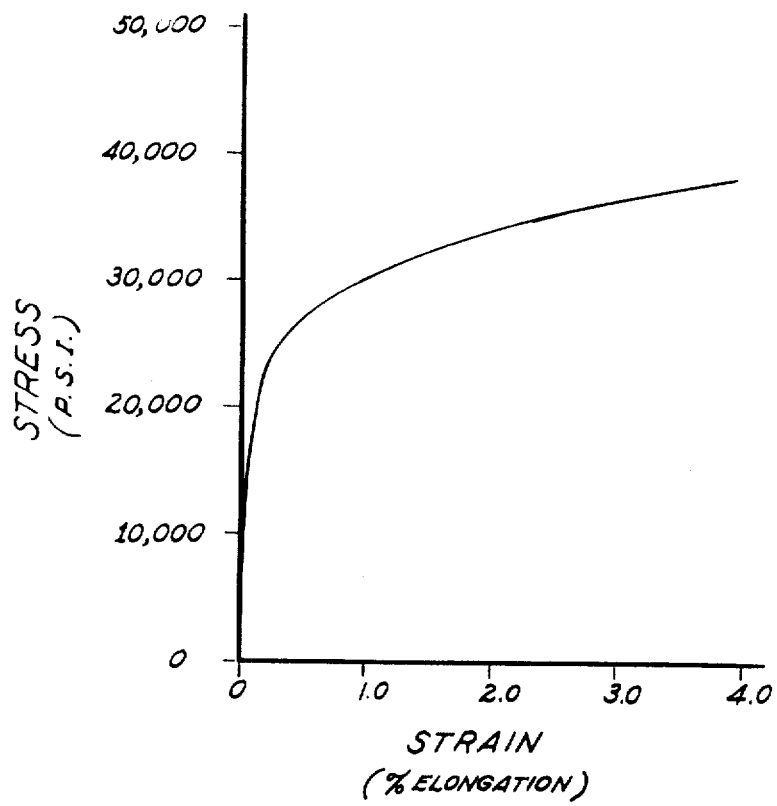
FIG. 5 is a graph illustrating characteristics of the composite material of FIG. 2.

In a preferred embodiment of this invention, for example, a cleaned strip of Type 304 stainless steel in annealed condition having a width of 12.50 inches and a thickness of about 0.015 inches is advanced between a pair of cleaned strips of Type 1008, aluminum killed, low carbon steel having a similar width and a thickness of about 0.067 inches, the strips being advanced together into the nip between a pair of squeezing rolls wherein the strips are squeezed together with substantial reduction in the thicknesses of the strips for metallurgically bonding the strips together in conventional manner. The resulting bonded composite metal laminate material is then subjected to an intermediate anneal in conventional manner and is rolled to a final gauge or thickness of 0.014 inches in which the central stainless steel layer of the laminate comprises approximately 10 percent of the total thickness of the laminate. At this point, the composite material has been reduced about 40 to 70 percent in thickness after the noted intermediate anneal and has relatively low formability. In accordance with this invention, the composite material is then advanced through a reducing atmosphere in a conventional strip annealing furnace at a temperature of 1950° F., the strip having a residence time of approximately one minute in the furnace. At this point the composite material displays an upper yield point of 46,000 psi, a tensile strength of 59,000 psi, and an elongation (in 2 inches) of about 35 percent. The composite laminate material is then heated in a slightly reducing atmosphere comprising a mixture of cracked city gas and nitrogen in a conventional bell furnace, the material being held at a temperature of 1100° F. for a period of approximately four hours. At this point, the composite material displays no yield point but displays a 0.2 percent offset yield strength of about 26,000 psi., a tensile strength of about 56,000 psi. and an elongation (in 2 inches) of about 40 percent. That is, the stress-strain curve for the composite metal laminate is as illustrated in FIG. 5. At this point, the stainless steel layer of the laminate is found to have undergone some intergranular carbide precipitation and displays less than the optimum corrosion resistance of Type 304 Stainless Steel. This composite material is then plated with copper on each side thereof to a thickness of 0.00015 inches in conventional manner and is edge trimmed. The plated and trimmed material is then formed in a conventional way to provide a double-walled automotive brake tubing configuration as illustrated in FIG. 3 having an outer diameter of about 0.187 inches. The tubing is then heated in a conventional tube furnace so that the copper plating on the composite laminate is melted for brazing formed portions of the composite material together in conventional manner for securing the composite material in the noted tubing configuration. In this tube furnace, the formed composite material is heated to a temperature of 2050° F. to 2070° F. with a residence time of about 1.125 minutes in the furnace. At this point, it is found that the initial corrosion resistance properties of the stainless steel layer of the laminate have been substantially restored. Where other stainless steel and low carbon steel materials as set forth in Tables I and II are embodied in similar laminates formed into similar tubings using similar heat treatments, similar results are obtained.

It will be understood that although particular embodiments of the laminate material, tubing and processes of this invention have been described above by way of illustration, modifications and equivalents of the disclosed embodiments are within the scope of this invention. For example, some of the advantages of this invention are obtained where the strip annealing type of heat treatment indicated at 20 in FIG. 1 is eliminated from the process of this invention. Similarly, although the tubing 32 is shown to be formed of a single strip of the laminate material 12, tubings formed from two or more strips of the laminate material 12 in conventional manner are also within the scope of this invention. Similarly, although the composite metal laminate material is shown to incorporate a single inner layer of stainless steel sandwiched between two relatively thicker outer layers of low carbon steel, advantages of this invention can also be obtained in a laminate material formed of two relatively thin layers of stainless steel material interleaved with three relatively thicker layers of low carbon steel material or in laminate materials having other generally similar laminate layer constructions within the scope of this invention, the three layer laminate described by way of illustrating this invention representing the preferred embodiment of the invention. It should be understood that although particular embodiments of the invention are illustrated, this invention includes modifications and equivalents thereof falling within the scope of the appended claims.

I claim:

1. A composite metal laminate material comprising an inner layer of austenitic stainless steel material sandwiched between and metallurgically bonded to a pair of relatively thicker outer metal layers formed of a plain low carbon steel material which normally displays a yield point if deformed while a substantial part of its carbon content is present as interstitial carbon, said stainless steel material being in annealed condition and being characterized by the presence of integranular carbide precipitate therein, said low carbon steel material being in annealed condition and being modified to have such a small proportion of its carbon content present as interstitial carbon that said bonded steel layers are deformable without displaying a yield point.

2. A composite metal laminate material as set forth in claim 1 wherein said stainless steel layer of said laminate material comprises from about 2 to about 25 percent of the total thickness of said composite material.

3. A composite metal laminate material as set forth in claim 2 wherein said stainless steel material is selected from the group consisting of Type 201, 202, 301, 302, 304 and 321 Stainless Steel materials and has additional carbon diffused therein.

4. A composite metal laminate material as set forth in claim 3 wherein said low carbon steel materials are selected from the group of plain low carbon steel materials having a composition, by weight of 0.13 percent (maximum) carbon, 0.25 to 0.60 percent manganese, 0.040 percent (maximum) phosphorous, 0.050 percent (maximum) sulfur, and the balance iron.

* * * * *